United States Patent
Weeks

(10) Patent No.: US 9,145,180 B2
(45) Date of Patent: Sep. 29, 2015

(54) BICYCLE RACK WITH WHEEL STOP

(71) Applicant: Brian L. Weeks, Prairie du Sac, WI (US)

(72) Inventor: Brian L. Weeks, Prairie du Sac, WI (US)

(73) Assignee: Graber Manufacturing, Inc., Waunakee, WI (US)

( * ) Notice: Subject to any disclaimer, the term of this patent is extended or adjusted under 35 U.S.C. 154(b) by 0 days.

(21) Appl. No.: 13/898,533

(22) Filed: May 21, 2013

(65) Prior Publication Data

US 2014/0083960 A1   Mar. 27, 2014

Related U.S. Application Data

(60) Provisional application No. 61/705,398, filed on Sep. 25, 2012.

(51) Int. Cl.
  *A47F 7/00* (2006.01)
  *B62H 3/04* (2006.01)
  *B62H 3/08* (2006.01)
  *B62H 3/00* (2006.01)

(52) U.S. Cl.
  CPC .. *B62H 3/04* (2013.01); *B62H 3/08* (2013.01); *B62H 3/00* (2013.01)

(58) Field of Classification Search
  CPC .............. B62H 3/00; B62H 3/04; B62H 3/08
  USPC ............... 211/17–24, 85.7; D12/115, 120, D12/406–408; 224/924, 537, 571
  See application file for complete search history.

(56) References Cited

U.S. PATENT DOCUMENTS

| | | | | |
|---|---|---|---|---|
| 529,939 A * | 11/1894 | Noderer | ........................ | 211/20 |
| 556,789 A * | 3/1896 | Walker | ........................ | 211/20 |
| 556,806 A * | 3/1896 | Chandler | ........................ | 211/20 |
| 562,669 A * | 6/1896 | Smart | ........................ | 211/20 |
| 602,415 A * | 4/1898 | Moore | ........................ | 211/19 |
| D30,815 S * | 5/1899 | Hart | ........................ | D12/115 |
| 677,804 A * | 7/1901 | Schulte | ........................ | 188/5 |
| 2,719,632 A * | 10/1955 | Sill | ........................ | 211/22 |
| 3,116,836 A * | 1/1964 | McCauley | ........................ | 211/21 |
| 3,229,874 A * | 1/1966 | Schneider et al. | ........... | 224/515 |
| 3,355,028 A * | 11/1967 | Mork | ........................ | 211/21 |
| D230,145 S * | 1/1974 | Johnson | ........................ | D12/115 |
| 3,786,928 A * | 1/1974 | Johnson | ........................ | 211/5 |
| 3,912,139 A * | 10/1975 | Bowman | ........................ | 410/3 |
| 4,262,899 A * | 4/1981 | Alvarez | ........................ | 482/61 |

(Continued)

FOREIGN PATENT DOCUMENTS

| | | | | |
|---|---|---|---|---|
| DE | 10147331 A1 * | 4/2003 | ........... | B62H 3/04 |
| TW | M364031 * | 9/2009 | ........... | B62H 3/04 |

OTHER PUBLICATIONS

"Madrax® Bicycle Parking That Reflects Your Vision", © 2011, pp. 19-20.

*Primary Examiner* — Joshua J Michener
*Assistant Examiner* — Devin Barnett
(74) *Attorney, Agent, or Firm* — Stiennon & Stiennon

(57) ABSTRACT

A bicycle rack has a wheel stop which has a front and back member which diverge from each other as they extend away from the vertical member, and which are connected at an acute angle to a side member. The effect of this arrangement is to incline the bicycle wheel to move to the sidewardmost position within the wheel stop such that the bicycle tilts toward the vertical member, more securely positioning it within the rack.

7 Claims, 1 Drawing Sheet

(56) References Cited

U.S. PATENT DOCUMENTS

| | | | |
|---|---|---|---|
| 4,306,660 A | 12/1981 | Livingston | |
| D263,945 S * | 4/1982 | Voegeli | D12/115 |
| 4,437,597 A * | 3/1984 | Doyle | 224/533 |
| 4,979,759 A * | 12/1990 | Solovay | 280/293 |
| 5,332,104 A | 7/1994 | Santella | 211/18 |
| D353,353 S * | 12/1994 | Katsaros | D12/115 |
| 5,449,074 A * | 9/1995 | Paulson et al. | 211/24 |
| D372,691 S * | 8/1996 | Eason | D12/115 |
| D375,472 S * | 11/1996 | Slater | D12/120 |
| D409,134 S * | 5/1999 | Will | D12/407 |
| 6,223,907 B1 * | 5/2001 | Graber | 211/5 |
| 6,321,962 B1 * | 11/2001 | Morris et al. | 224/505 |
| 6,336,562 B1 * | 1/2002 | Mori | 211/20 |
| 6,491,195 B1 * | 12/2002 | McLemore et al. | 224/537 |
| 6,588,603 B1 * | 7/2003 | West | 211/19 |
| 6,604,639 B2 * | 8/2003 | Chen | 211/85.7 |
| D497,873 S | 11/2004 | Graber | |
| 7,055,700 B2 * | 6/2006 | West | 211/19 |
| D543,906 S * | 6/2007 | Hoadley et al. | D12/115 |
| D585,793 S | 2/2009 | Skalka | |
| D602,403 S * | 10/2009 | Shaha et al. | D12/115 |
| D604,206 S * | 11/2009 | Selzer et al. | D12/115 |
| 7,857,177 B2 * | 12/2010 | Reeves et al. | 224/403 |
| D665,725 S * | 8/2012 | Laverack et al. | D12/412 |
| D666,537 S * | 9/2012 | Hoadley et al. | D12/115 |
| D669,016 S * | 10/2012 | Pozzi | D12/408 |
| D678,131 S * | 3/2013 | Hoadley et al. | D12/115 |
| 8,413,820 B2 * | 4/2013 | Steadman et al. | 211/21 |
| D697,837 S * | 1/2014 | Kirn | D12/115 |
| 2002/0125279 A1 * | 9/2002 | Edgerly et al. | 224/310 |
| 2003/0010729 A1 * | 1/2003 | Lopez De Luzuriaga | 211/22 |
| 2004/0124159 A1 * | 7/2004 | West | 211/19 |
| 2005/0199670 A1 * | 9/2005 | Lloyd et al. | 224/507 |
| 2007/0000962 A1 * | 1/2007 | Reeves | 224/536 |
| 2007/0235400 A1 * | 10/2007 | Wald | 211/85.7 |
| 2007/0246496 A1 * | 10/2007 | Reeves et al. | 224/403 |
| 2007/0256989 A1 * | 11/2007 | Steadman et al. | 211/21 |
| 2008/0000848 A1 * | 1/2008 | Chiu | 211/21 |
| 2008/0067209 A1 * | 3/2008 | Gunn | 224/514 |
| 2010/0122958 A1 * | 5/2010 | Tsai | 211/21 |
| 2011/0220594 A1 * | 9/2011 | Chuang | 211/22 |
| 2012/0168479 A1 * | 7/2012 | McKenzie | 224/427 |
| 2013/0264297 A1 * | 10/2013 | Long | 211/20 |
| 2013/0270201 A1 * | 10/2013 | Vineyard | 211/21 |

* cited by examiner

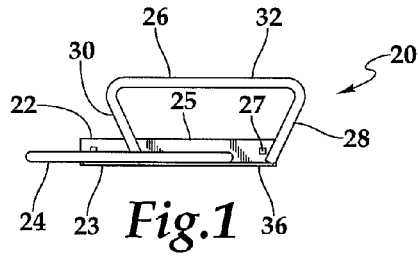
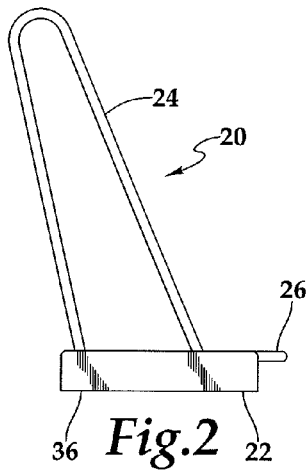
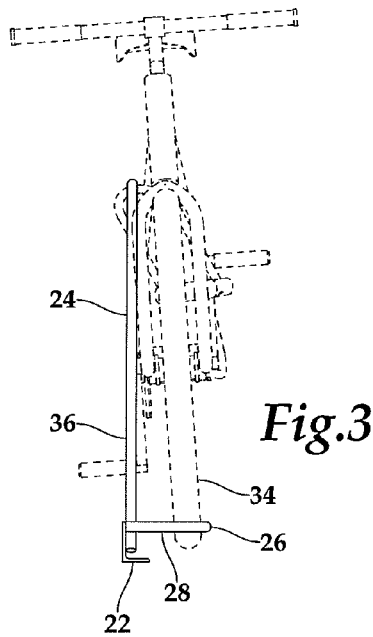
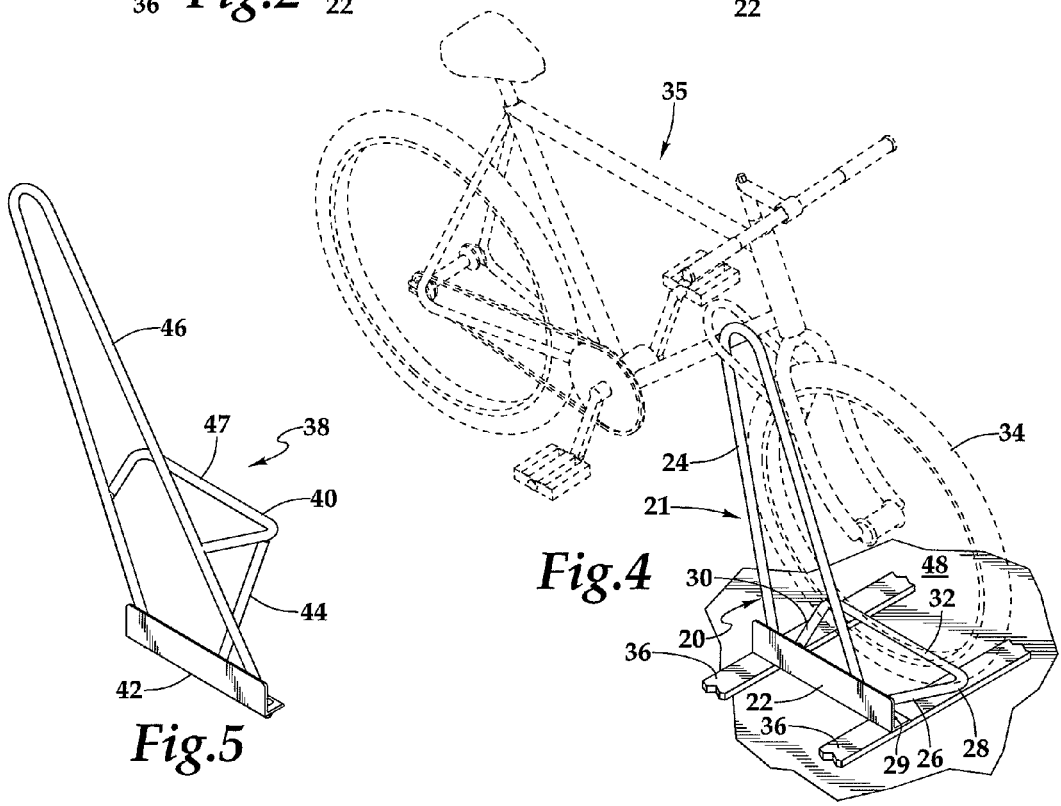

BICYCLE RACK WITH WHEEL STOP

CROSS REFERENCES TO RELATED APPLICATIONS

This application claims the benefit of priority of U.S. provisional patent app. No. 61/705,398, filed Sep. 25, 2012, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to bicycle racks.

When a bicycle is parked and locked to a bicycle rack, it is important that the bicycle remain in an upright condition and correctly oriented with respect to the rack. If the bicycle becomes disturbed from the proper position, even though it may remain securely fastened to the rack, it may interfere with other bicycles on the rack, or may otherwise obstruct the path near the rack and be less than optimally stored while its user is away.

A common bicycle rack employs some type of upright post or member to which the bicycle is fastened, and a lower looped wheel stop which has parallel front and back members joined by a perpendicular side member. A wheel of the bicycle extends downwardly into the wheel stop to prevent forward and rearward displacement of the wheel. There is space for sideward movement of the wheel, to allow the bicycle to be leaned at an angle towards the upright member. However, this option for variation in placement of the wheel means that it is possible for the user to place the bicycle in a nearly vertical condition against the upright member, which can be unstable, resulting in the bicycle falling over.

What is needed is a bicycle rack which is conducive to secure upright storage.

SUMMARY OF THE INVENTION

The bicycle rack of the present invention has a wheel stop which has a front and back member which diverge from each other as they extend away from the vertical member, and which are connected at an acute angle to a side member. The effect of this arrangement is to incline the bicycle wheel to move to the sidewardmost position within the wheel stop such that the bicycle tilts toward the vertical member, more securely positioning it within the rack.

It is an object of the present invention to provide a bicycle rack which will hold a bicycle wheel parallel to the rack, which will direct the wheel away from the vertical member so the bicycle leans towards the vertical member, and which restrains the wheel from turning in a vertical plane.

Further objects, features and advantages of the invention will be apparent from the following detailed description when taken in conjunction with the accompanying drawings.

BRIEF DESCRIPTION OF THE DRAWINGS

FIG. 1 is a top plan view of a bicycle rack unit of the present invention.

FIG. 2 is a left side view of the rack unit of FIG. 1.

FIG. 3 is a front elevational view of the rack unit of FIG. 1.

FIG. 4 is a fragmentary isometric view of a bicycle rack incorporating the rack unit of FIG. 1 showing the positioning of a bicycle therein.

FIG. 5 is an isometric view of an alternative embodiment rack unit of the present invention, in which the wheel stop is elevated.

DESCRIPTION OF THE PREFERRED EMBODIMENTS

Referring more particularly to FIGS. 1-5, where like numbers refer to similar parts, a bicycle rack 21 shown in FIG. 4, is comprised of one or more rack units 20, shown in FIGS. 1-3. Each rack unit 20 has a base member 22 formed, for example, of a steel angle member having a vertical web 23 and a horizontal web 25. The horizontal web 25 may be formed with fastener openings 27 through which fasteners 29, as shown in FIG. 4, may extend to fix the rack unit 20 to a mounting surface 48 or to connecting bars 36. An upright member 24 is a generally inverted tapered U-member which is fixed to the base member 22 and which extends in a vertical plane. The upright member may be formed of a bent steel rod. The upright member defines an upwardly extending plane for engagement with a bicycle to restrict tipping of the engaged bicycle away from a vertical plane beyond a determined limit.

A wheel stop 26 is fixed to the base member 22 at the base of the upright member 24. The wheel stop 26 is fabricated of some stiff element such as ¾ inch steel rod stock. As shown in FIG. 1, the wheel stop 26 has a front member 28 and a rear member 30 which diverge from each other as they extend away from the upright member 24, and which adjoin a side member 32 at acute angles. The front and rear members 28, 30, are wider than the width of the bicycle tire anticipated to be accommodated, thus making it possible for the wheel 34 of a bicycle 35 to be positioned some distance away from the upright member 24 at its base. The front to back spacing of the front and rear members 28, 30 is selected to accommodate the smallest wheel anticipated for the rack. For example, the spacing may be about 13 inches to receive a 20" bicycle wheel. The distance of the side member 32 from the base member 22 may be about 5½ inches. The angles between the front and rear members and the side member is less than 90 degrees and more than about 30 degrees, and preferably between about 45 degrees and about 70 degrees, and in the illustrated example is about 65 degrees.

As shown in FIGS. 3 and 4, the result of the diverging front and rear members 28, 30, is that the wheel when positioned on the wheel stop 26 will work its way to the outside of the wheel stop alongside the side member, at which point the bicycle will tend to lean towards the upright member 24 in an optimal position, more securely positioning within the rack.

A base member 22, an upright member 24, and a wheel stop 26 define a rack unit 20 which can be fastened directly to a concrete pavement, or to horizontal cross members 36 such as flat steel bar stock to join with other rack units to accommodate as many bicycles as is desired.

To allow more close spacing of bicycles within a rack assembly of multiple rack units, it is desirable to raise the handlebars of alternating bicycles, to avoid interference therebetween. For this purpose, an alternative rack unit 38 such as the one shown in FIG. 5 may be used. This rack unit 38 has an upright member 46 which extends upwardly from the base member 42, and a wheel stop 40 extending from the upright member and supported to the base member by a support member 44 but which otherwise operates in a similar fashion to the rack unit 20. The support member 44 may be a steel rod welded to extend between the side member 47 of the wheel stop and the base member 42. The alternative rack units 38 may be connected into a single rack with the rack units 20, either all facing the same direction for entry of the bicycles from the same side, or alternating to permit entry from one or the other sides of the rack.

It is understood that the invention is not limited to the particular construction and arrangement of parts herein illustrated and described, but embraces all such modified forms thereof as come within the scope of the following claims.

I claim:

1. A bicycle and bicycle rack assembly comprising:
a bicycle having a wheel with a tire; and
a bicycle rack of the type having a base member fixed to a support surface,
and at least one upwardly extending upright member,
fixed to the base member and defining an upwardly extending plane for engagement with the bicycle to restrict tipping of the engaged bicycle away from a vertical plane beyond a determined limit, and a wheel stop fixed in relation to the upright member, the wheel stop having a front member which extends away from the upright member, a rear member which extends away from the upright member and is spaced rearwardly of the front member, and a side member which is fixed with respect to the base member, the side member being positioned between the front member and the rear member, wherein the wheel stop rear member is a rod defining a linear line segment which diverges from the front member as it extends away from the upright member, the line segment defining an angle with respect to the side member of from between 45 degrees to 70 degrees;
the wheel stop front member being a rod defining a linear line segment which defines an angle with respect to the side member of from between 45 to 70 degrees, such that a distance between the front member and the rear member is greater measured at the side member than at the upright member;
wherein the bicycle wheel tire engages the wheel stop and is supported between the front member and the rear member; and
wherein the side member is fixed with respect to the upright member and the front member and the rear member and no other element is connected between the side member and the upright member which obstructs the tilting of the bicycle wheel engaged in the wheel stop towards the upright member, the arrangement of the wheel stop having the effect to incline the bicycle wheel to move to the sidewardmost position within the wheel stop such that the bicycle tilts toward the upright member, more securely positioning it within the rack, and wherein there is no obstruction extending from the rack above the wheel to restrict the upward movement of the wheel.

2. The bicycle rack of claim 1 wherein the front member extends from the side member.

3. The bicycle rack of claim 1 wherein the rear member extends from the side member.

4. The bicycle rack of claim 1 wherein the first angle is equal to the second angle.

5. The bicycle rack of claim 1 wherein the upwardly extending upright member comprises two upwardly extending segments connected to the base member and joined together at a position above the base member.

6. A bicycle and bicycle rack assembly comprising:
a bicycle rack having a base member, the base member having a vertical web and a horizontal web, the base member arranged for positioning with respect to a support surface;
an upwardly extending upright member having a base fixed to the base member;
a wheel stop fixed to the base member or to the upright member, the wheel stop having three substantially rectilinear rod segments, consisting of a front member which extends away from the upright member, a rear member which extends away from the upright member and is spaced rearwardly of the front member, and a side member which extends between the front member and the rear member, a first angle being defined between the side member and the rear member, and a second angle being defined between the side member and the front member; the first angle and the second angle being between 45 degrees and 70 degrees such that the rear member diverges from the front member as it extends away from the upright member;
a bicycle having a wheel with a tire with an exterior diameter, the wheel having a width of a first length, wherein the tire is supported on the wheel stop, such that the tire extends between the front member and the rear member, and wherein the side member is spaced a second distance from the upright member which is greater than the first length, such that the bicycle wheel is positioned a third distance away from the upright member at its base, the wheel stop configured to engage the wheel of the bicycle and retain it against the side member, the wheel stop being configured to engage the wheel supported on the front member and the rear member at locations on the wheel spaced a fourth distance apart, wherein the bicycle rack does not obstruct the rotation of the engaged wheel about an upright axis, such that the fourth distance between the wheel engagement locations is greater when the wheel engagement locations are positioned more closely to the side member or the wheel is tilted more about the upright member away from a position parallel to the side member, the arrangement of the wheel stop having the effect to incline the bicycle wheel to move to the sidewardmost position within the wheel stop such that the bicycle tilts toward the upright member, more securely positioning it within the rack, the rectilinear rod segments of the front and rear members of the wheel stop permitting travel of the bicycle wheel thereon along the length of the front and rear members from the upright member to the side member, and wherein there is no obstruction extending from the rack above the wheel to restrict the upward movement of the wheel.

7. The bicycle rack of claim 6 wherein the first angle is equal to the second angle.

* * * * *